United States Patent
Woodall et al.

(10) Patent No.: US 6,293,202 B1
(45) Date of Patent: Sep. 25, 2001

(54) PRECISION, AIRBORNE DEPLOYED, GPS GUIDED STANDOFF TORPEDO

(75) Inventors: Robert Woodall, Lynn Haven; Felipe Garcia, Panama City, both of FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/560,533

(22) Filed: Apr. 25, 2000

Related U.S. Application Data

(63) Continuation-in-part of application No. 09/137,874, filed on Aug. 17, 1998, now Pat. No. 6,082,675.

(51) Int. Cl.$^7$ .................................................. F42B 10/56
(52) U.S. Cl. ............................ 102/387; 102/386; 244/14
(58) Field of Search .................................. 102/386, 387, 102/354; 244/14

(56) References Cited

U.S. PATENT DOCUMENTS

| | | | |
|---|---|---|---|
| 4,471,923 | * | 9/1984 | Hoppner et al. ........................ 244/63 |
| 4,730,793 | * | 3/1988 | Thurber, Jr. et al. .................. 244/3.1 |
| 5,012,717 | * | 5/1991 | Metersky et al. ...................... 89/1.11 |
| 5,118,052 | * | 6/1992 | Alvarez Calderon F .............. 244/49 |
| 5,344,105 | * | 9/1994 | Youhanale ........................... 244/3.14 |
| 5,866,838 | * | 2/1999 | Mayersak ................................ 89/1.56 |
| 5,878,979 | * | 3/1999 | Fisher et al. .......................... 244/139 |
| 6,037,899 | * | 3/2000 | Weber .............................. 342/357.06 |
| 6,056,237 | * | 5/2000 | Woodland ............................ 244/3.15 |
| 6,142,411 | * | 11/2000 | Coblegh ............................... 244/3.14 |
| 6,237,496 | * | 5/2001 | Abbott ................................. 102/384 |

FOREIGN PATENT DOCUMENTS

1605269 * 6/1970 (GB) ............................. B64D/17/36

* cited by examiner

*Primary Examiner*—Charles T. Jordan
*Assistant Examiner*—Kimberly S Smith
(74) *Attorney, Agent, or Firm*—Harvey Gilbert; Donald G. Peck

(57) ABSTRACT

A standoff delivery system is responsive to GPS coordinate signals and in-flight GPS signals to deploy a torpedo at a remote location that avoids the limitations and hazards attendant conventional deployment by full size aircraft. A gliding rigid winged unmanned aircraft carries the torpedo to a desired remote location. A GPS receiver on the aircraft enters GPS coordinate signals representative of the remote location and receives GPS signals representative of the location of the unmanned aircraft. A control signal generator produces control signals in response to both of the GPS signals and feeds control signals to servos that displace control surfaces to pilot the unmanned aircraft. The torpedo is released and descends via parachute in response to GPS signals that are representative of at least the proximity of the remote location. This system provides for clandestine deployment of a torpedo without exposing manned aircraft to danger.

14 Claims, 2 Drawing Sheets

PRECISION, AIRBORNE DEPLOYED, GPS GUIDED STANDOFF TORPEDO

CROSS REFERENCE TO RELATED APPLICATION

This is a continuation in part of U.S. patent application entitled "Standoff Delivered Sonobuoy" by Robert Woodall et al., U.S. Patent and Trademark Office Ser. No. 09/137,874 filed Aug. 17, 1998 now U.S. Pat. No. 6,082,675 and incorporates all references and information thereof by reference herein.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to deployment of torpedoes. In particular, this invention relates to a method and system for remotely delivering torpedoes accurately and clandestinely with reduced exposure to hostile response.

Torpedoes are effective against shipping. Most navies have numerous attack torpedoes in inventory. These torpedoes use various sensors and data inputs to seek and engage enemy ships or submarines. Unless attack torpedoes are released from a mine, they are usually launched from surface, subsurface, and airborne platforms to engage and destroy targets. These deployments may work reasonably well under a variety of operational scenarios, but they cannot deliver a torpedo in an area that is strongly defended without placing the host air or sea platform at great risk. This is because torpedo-dispensing platforms usually need to perform their torpedo-dispensing mission well within the detection range of the target. Consequently, the target and other vessels may retaliate and hunt them down. In other words, the conventional deployment methods for torpedoes are observable, and the presence of the relatively large platform alerts others so that its activities are closely monitored and invite decisive countermeasures.

Launching torpedoes by relatively undetectable submarines is not without its disadvantages. Submarines are slow as compared to torpedo dispensing aircraft. If a submarine is to engage a target about 100 nautical miles from its position, it might take many hours to navigate the distance underwater. Thus, to ensure stealthy operation, a submarine's slow and careful progress will operationally limit it, especially if the operation is taking place through a hostile monitored region. Once a torpedo is launched, the submarine's location is likely to be revealed. Evasive maneuvering during the submarine's withdrawal to safer waters location may be needed to ensure survivability. This can take hours during which time the submarine is vulnerable to counter attack from surface, subsurface, and airborne platforms. Thus, airborne platforms may be more desirable to deliver torpedoes from safe and undetected standoff positions. Some aircraft can take less than an hour to deploy torpedoes and return to base without detection. However, if such aircraft are detected, they too are vulnerable to destruction.

Thus, in accordance with this inventive concept, a need has been recognized in the state of the art for a means to remotely deploy torpedoes clandestinely with GPS accuracy that reduce risks and hazards.

SUMMARY OF THE INVENTION

The present invention is directed to providing a method of and means for remotely deploying a torpedo to a remote area. Mounting a torpedo on a rigid winged unmanned aircraft and flying the torpedo to a remote location calls for generating control signals in the unmanned aircraft in response to entered GPS coordinate signals representative of the remote location and to received GPS signals representative of the location of the unmanned aircraft. Steering the unmanned aircraft to the remote location in response to the control signals allows releasing the torpedo from the flying unmanned aircraft in response to GPS signals that are representative of the proximity of the remote location.

An object of the invention is to provide a method and means for remotely deploying a torpedo with GPS accuracy.

Another object of the invention is to provide an unmanned aircraft deploying a torpedo to a remote location in response to GPS signals.

Another object of the invention is to provide method and means for remotely deploying a torpedo according to GPS coordinates and signals.

Another object of the invention is to provide method for deploying standoff delivered torpedoes that provides the capability of remotely launching torpedoes in defended areas without exposing friendly craft to detection and hostile action.

Another object of the invention is to provide for deployment of torpedoes from an unmanned gliding aircraft when conventional systems for deploying torpedoes are unavailable or could not perform such missions.

Another object of the invention is to provide a method to accurately deploy torpedoes using GPS signals and much closer to high-risk areas without exposing craft or personnel to risk.

Another object of the invention is to provide a method and system that provide for clandestine deployment of torpedoes.

Another object is to provide a system that allows torpedoes to be remotely emplaced many nautical miles from a point of aim.

Another object of this invention is to provide a method and means to deploy torpedoes in engagement areas that can be lethal for conventional aircraft deploying torpedoes in current fashion.

These and other objects of the invention will become more readily apparent from the ensuing specification when taken in conjunction with the appended claims.

DESCRIPTION OF THE PREFERRED EMBODIMENT

Figure 1:
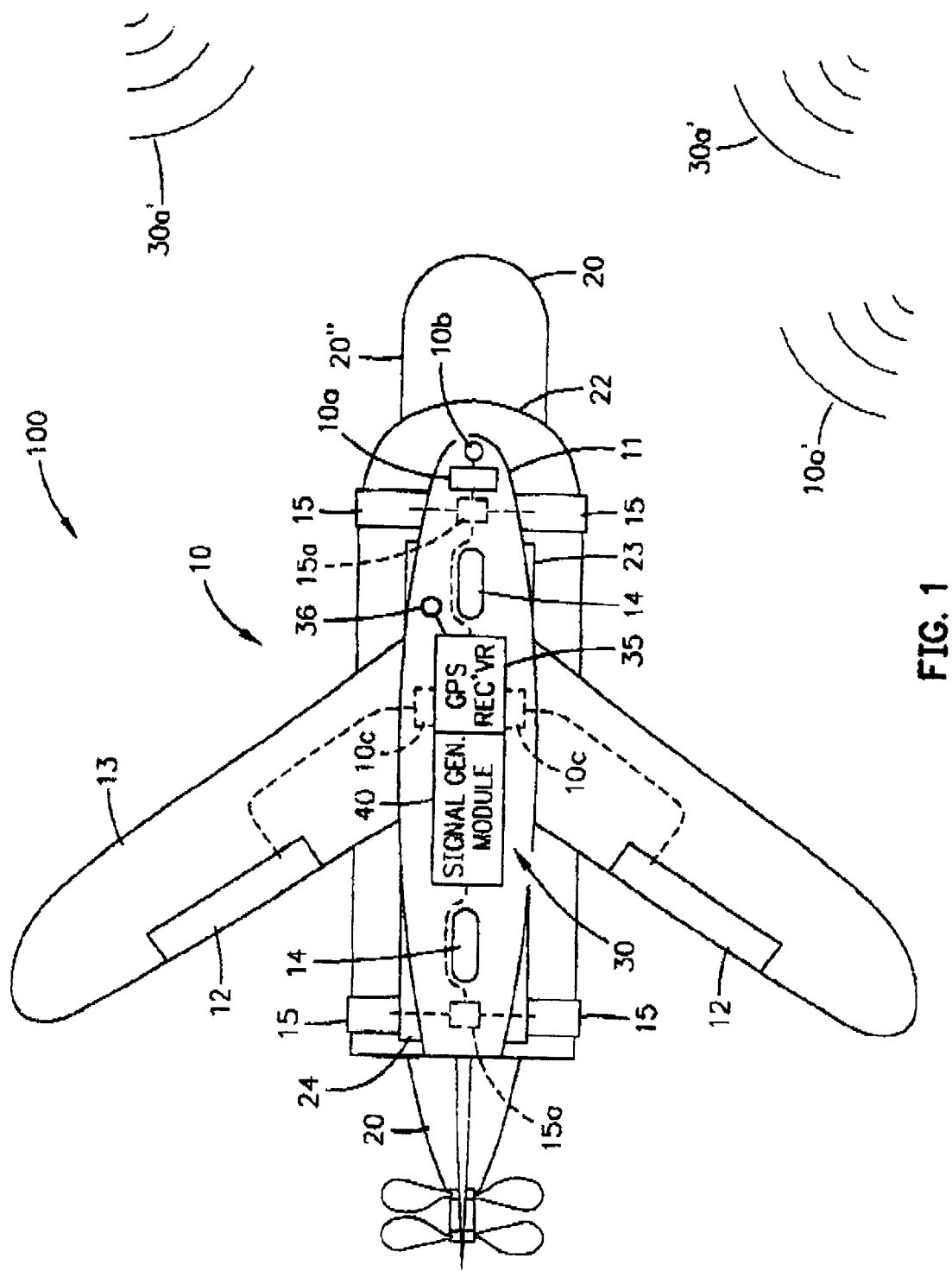
FIG. 1 is a schematic top view of a guided wing releasably mounting a torpedo for its remote deployment

Referring to FIG. 1 of the drawings, system 100 deploys a torpedo 20 to a remote location, or site via a glider structure or guided wing 10 that functions as a rigid winged unmanned small aircraft. Guided wing 10 has a pair of pivotable wings 13 which are depicted as partially pivotally extended. These wings can be folded to lie alongside fuselage 11 during release from a launch platform, such as a conventional aircraft, or can be extended to be nearly perpendicular from fuselage 11 during gliding and deployment of torpedo 20 to the remote location where torpedo 20 may be guided by wire, active homing, and/or passive homing.

Guided wing 10 is released (launched) from the conventional aircraft or may be raised to heights for launching by a rocket or balloon. Guide wing 10 has an adaptor plate 22 joined to releasable band clamps 15 that are wrapped about case 20″ of an elongate cylindrically-shaped torpedo 20. Adaptor plate 22 houses an explosive charge 23 that may aid separation of guided wing 10 from torpedo 20 when torpedo 20 is to be released from guided wing 10. Guided wing 10 may have separation lugs (not shown) engaging wing 10 and torpedo 20 to hold them together during flight instead of clamps 15. Adaptor plate 22 also houses parachute 24 that is deployed after this separation, or release to slow the fall of torpedo 20 into water. Releasable clamps 15 are actuated by servo controls 15a to selectively engage and disengage case 20″ of torpedo 20. Clamps 15 hold torpedo 20 in place for the duration of a flight by launch platform to a desired remote location. Then, clamps 15 are released, or disengaged, separation charge 23 is exploded, and torpedo 20 is slowed in its descent by parachute 24 to the ocean.

Some of the components of guided wing 10 are typical of many proven designs developed over the years for a variety of radio controlled model aircraft and drone aircraft. Like nearly all of this variety of aircraft, guided wing 10 has one type or another radio receiver 10a connected to an antenna 10b that receives remotely originating radio control signals 10a′. Receiver 10a is coupled to provide appropriate signals for suitable servo controls 10c that are each joined to displace control surfaces 12. Control surfaces 12 cooperate to provide substantially the same composite functions as ailerons, elevators, and rudders of conventional model aircraft, and are displaced in accordance with remote control signals 10a′ received on antenna 10b to pilot guided wing 10. This basic radio control capability is kept in this system 100 of this invention to launch and divert guided wing 10 or return it to the launch platform at any time after launch.

Guided wing 10 also includes GPS system 30 that has GPS receiver 35 coupled to GPS antenna 36. GPS receiver 35 is typical of many commercially available units that are preprogrammed or preset with coordinate signals to "home in" on a remote location after the GPS coordinates of the remote location (or destination way point) are entered into it. Once the desired GPS coordinate signals are entered, the well-known combination of GPS receiver 35 and antenna 36 sense GPS signals 30a′ from several satellites 30a, see FIG. 2, to provide signals representative of the location of guided wing 10 and corrective signals to correctly orient guided wing 10 toward the preprogrammed remote site.

The GPS coordinate signals and corrective signals are fed from GPS receiver 35 to signal generator module 40. Signal generator module 40 generates appropriate control signals based on the preset coordinate signals and corrective signals and feeds these control signals to servo controls 10c and 15a to displace control surfaces 12 and clamps 15.

Components and interconnections for signal generation module 40 and servo controls 10c and 15a are well known in the art. A considerable number of off-the-shelf units have been available for radio controlled model aircraft and boats for quite some time. In addition, boating and aircraft enthusiasts have used numerous navigational aids, such as auto pilots, which interface with GPS signals to steer a given course to a preset destination. Therefore, having this disclosure before him, one skilled in the art to which this invention pertains is free to choose and appropriately interconnect suitable components for the GPS responsive system of this invention from a number of freely available model and full-scale marine and aircraft systems.

A satisfactory design for a guided wing 10 might be the guided wing kit marketed by Leigh Aerosystems Corp. of Carlsbad, Calif., under the trademark LONGSHOT™. This guided wing kit has control circuitry and mechanisms responsive to entered GPS coordinate signals and remotely transmitted GPS signals from NAVSTAR satellites and has been mounted on heavy pieces of ordnance.

Wings 13 are pivoted out from fuselage 11 after they have been released from a mother aircraft. The extended wings provide sufficient lift to carry the ordnance on a gliding decent to a predetermined target. Other glide wing designs that may be used are disclosed in U.S. Pat. Nos. 4,453,426 and 4,842,218. Still other guided wing kits such as those under the trademark CONDOR of Leigh Aerosystems, or the military designation JDAM may be selected to deploy torpedoes 20 that may include torpedoes guided by wire, active homing, and/or passive homing and known under the as MK-46, MK-48, or MK-50 of the U.S. Navy.

A designer is free to select an appropriate design for guided wing 10; however, it must have the strength and lift capabilities to carry and fly torpedo 20 with its interconnected parachute 24 about 50 or more nautical miles downrange to a designated remote location, or site. At this location or at least the proximity of the remote location, guided wing 10 releases torpedo 20 and, after a preset period has elapsed, parachute 24 slows its decent sufficiently to assure damage-free entry into the water. Torpedo 20 can search regions of the ocean, such as in or near harbors or shipping lanes, without exposing those that deployed it to danger or adverse publicity. Because of the small size, low noise and reduced radar and IR signatures of guided wing 10, this deployment of torpedo 20 may be clandestine.

Figure 2:
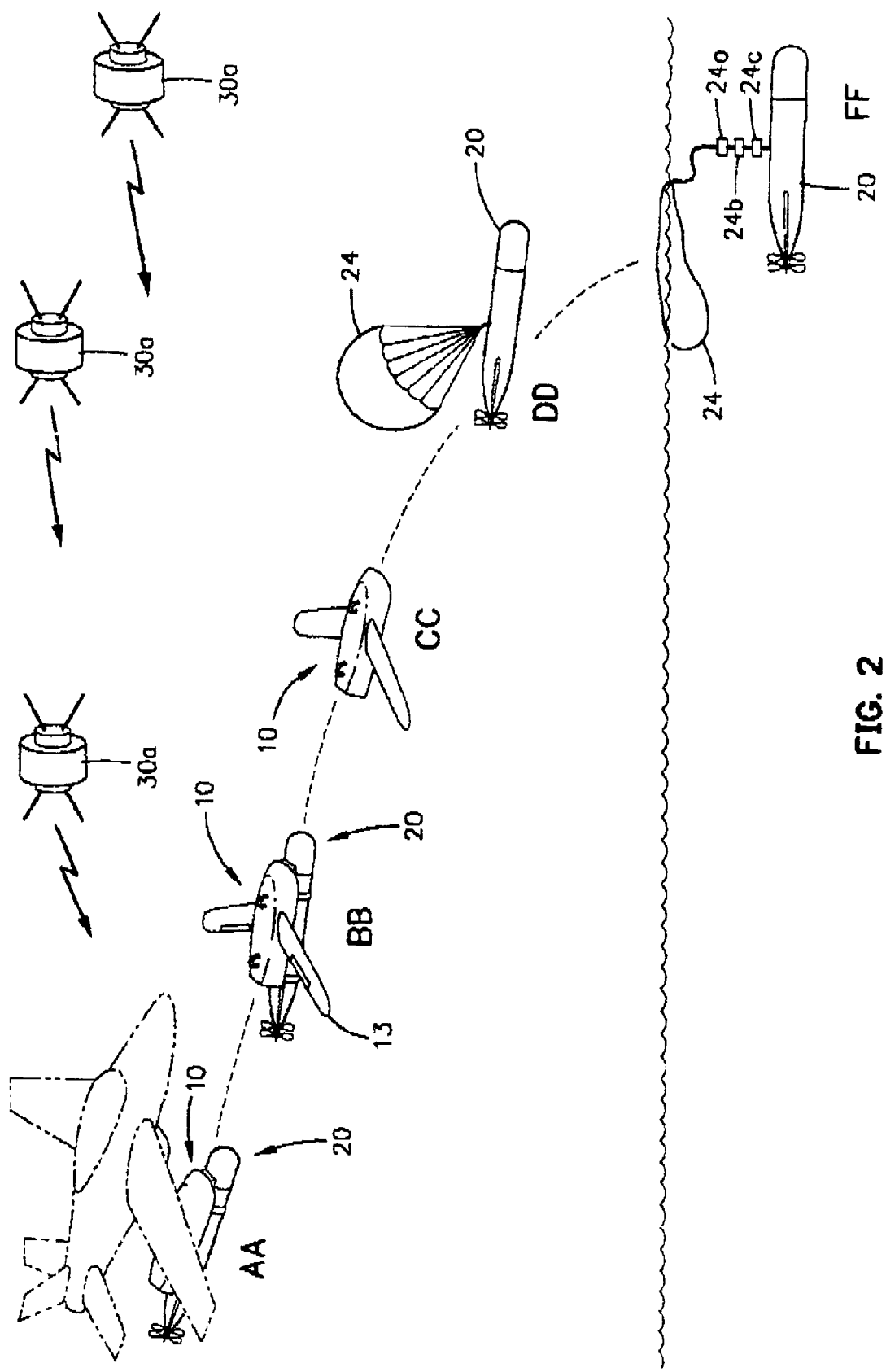
FIG. 2 depicts the deployment sequence.

Referring also to FIG. 2, system 100 is depicted during its operational deployment sequence. Before takeoff of the deploying conventional aircraft, guided wing 10, torpedo 20, and parachute 24 of system 100 are mounted on a bomb rack via rings 14. Torpedo 20 may be attached in pairs or singularly with dummy ballast on the opposite wing of the launching aircraft. Any torpedo 20 suitable for the task may be selected such as a MK-46, MK-48, or MK-50 torpedo. Also, at this time and/or during flight, the GPS aim point coordinates for deployment of torpedo 20 are entered into GPS system 30. The aircraft flies to an appropriate altitude, 30,000 ft., for example, and GPS system 30 acquires GPS signals 30a′ from NAVSTAR satellites 30a. When guided wing 10 and torpedo 20 are within range of the remote target location, they are released AA from the bomb rack of the aircraft which returns to base. This range may be about 50 nautical miles that guided wing 10 glides. Wings 13 unfold BB and GPS receiver 35 steers guided wing 10 toward the target location in accordance with the previously entered GPS coordinate data, and GPS signals acquired en route from NAVSTAR satellites 30a bring about course corrections via servo manipulations of control surfaces on wings 13.

Guided wing 10 thereby steers torpedo 20 to an area approximately one nautical mile from the desired location and, optionally, may angle to a steep terminal descent to the aim point. When guided wing 10 and torpedo 20 reach within 2000 feet of the target area, guided wing 10 is jettisoned, or separated CC by separation of bands 15 and/or detonation of explosive charge 23 to deploy DD parachute 24 to slow the impact of torpedo 20 so that it is not damaged by entry in the water. Wing 10 falls away and torpedo 20 descends slowly to a damage free landing FF in the sea near the original GPS aim point (or within an area considered to be within an acceptable proximity of a desired location).

After entry in the water of torpedo 20 and at a depth of about 10 feet, a pressure switch and/or water sensor close so that an attached battery (not shown) fires a squib-and-separation charge (schematically shown as 24a, 24b, and 24c, respectively) to free parachute 24 from torpedo 20. Closing of pressure switch 24a and firing of separation charge 24c initiates the main battery power, seeker logic, and fuel propulsion systems of torpedo 20. This sequence ensures safety to the aircraft during deployment as well as to allow torpedo 20 to initiate at the proper time within the proper environment. Thereafter, torpedo 20 begins to actively acquire the targeted enemy vessel using active and passive sonar techniques, as designed. Upon determination by logic on torpedo 20 that it has acquired a valid target, torpedo 20 travels through the water a predetermined distance from the targeted vessel and detonates its main warhead at the target. An adversary may expend resources to begin a counter attack, but no platform will be detected since the deploying aircraft is far from the scene.

System 100 of this invention allows conventional aircraft to be used to deploy torpedo 20 from a safe standoff position, with pin point GPS accuracy. This allows the aircraft and its crew to stay out of harms way during deployment of torpedo 20. System 100 allows for a stealthy emplacement of torpedo 20 so that an adversary may be misled into believing an attack is coming from a nearby platform, and consequently, critical resources may be expended chasing after something that does not exist. System 100 also may be used to deceive and create the illusion that a number of nearby platforms for dispensing torpedoes 20 are operating in vast areas. This illusion may help conceal the actual locations of the real submarines. In addition, system 100 can be used to neutralize targets in water that is shallower than where a submarine can safely operate.

In accordance with this invention, a GPS responsive system is provided for safe delivery and emplacement of torpedoes 20 in engagement areas that would otherwise be dangerous or lethal for conventional aircraft if they were to deploy torpedoes in current fashion. This system also clandestinely deploys and activates torpedoes 20 where they are needed at considerable ranges. This invention has the capability to remotely deliver torpedo 20 from a standoff range and can perform this task when conventional aircraft and helicopters are unavailable for such missions. This invention utilizes superior GPS technology to emplace torpedoes much closer to high risk areas without putting craft or personnel at risk.

The disclosed components and method of deployment as disclosed herein all contribute to the novel features of this invention. Torpedoes can be more reliably and effectively utilized since others are not alerted to their emplacement in a contested region of the ocean. In addition, many of the hazards are avoided that characterize the conventional deployment of torpedoes by full scale aircraft and ships.

Furthermore, having this disclosure in mind, one skilled in the art to which this invention pertains will select and assemble suitable components for fabrication of differently configured guided wings 10 from among a wide variety of materials and components available in the art to satisfactorily deploy different torpedoes 20 as disclosed herein. Therefore, the disclosed arrangement is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. A standoff delivery system for remotely deploying a torpedo to a remote location without exposing personnel to risk at said remote location comprising:

a torpedo having an interconnected parachute;

an unmanned aircraft having rigid wings for flying said torpedo and parachute to said remote location;

means mounted on said rigid winged unmanned aircraft for entering GPS coordinate signals representative of said remote location and for receiving GPS signals representative of the location of said rigid winged unmanned aircraft, said entering and receiving means includes a GPS antenna and receiver;

means connected to said GPS antenna and receiver for generating control signals in response to both of the GPS signals;

means coupled to said generating means for piloting said rigid winged unmanned aircraft to said remote location in response to said control signals; and means mounted on said rigid winged unmanned aircraft for releasing said torpedo from said rigid winged unmanned aircraft in response to GPS signals representative of at least an acceptable proximity of said remote location.

2. A system according to claim 1 further in which said torpedo is selected from the group consisting of torpedoes guided by wire, active homing, and passive homing.

3. A system according to claim 2 in which said parachute of said torpedo is deployed as said torpedo is released from said rigid winged unmanned aircraft by said releasing means.

4. A system according to claim 3 in which said piloting means includes servo controls joined to displace control surfaces according to said control signals to pilot said rigid winged unmanned aircraft.

5. A system according to claim 4 further including:

an RF antenna and receiver on said rigid winged unmanned aircraft to receive remotely originating RF control signals and to couple said RF control signals to said servo controls, said servo controls being responsive to displace said control surfaces in accordance with said RF control signals.

6. A system according to claim 5 in which said rigid winged unmanned aircraft is a guided wing design having rigid wings pivoted to laterally extend therefrom.

7. A method of remotely deploying a torpedo to a remote location without exposing personnel to risk at said remote location comprising the steps of:

mounting a torpedo on a rigid winged unmanned aircraft;

flying said torpedo to said remote location on said rigid winged unmanned aircraft;

generating control signals in response to entered GPS coordinate signals representative of said remote location and impinging GPS signals representative of the location of said rigid winged unmanned aircraft;

steering said rigid winged unmanned aircraft to said remote location in response to said control signals; and releasing said torpedo from said rigid winged unmanned aircraft in response to GPS signals representative of at least an acceptable proximity of said remote location.

8. A method according to claim 7 in which said step of generating comprises the step of:

receiving GPS signals on an antenna and receiver on said rigid winged unmanned aircraft, said received GPS signals being representative of its location.

9. A method according to claim 8 in which said step of releasing comprises the step of:

deploying a parachute from said torpedo to slow the descent at said acceptable proximity of said remote location.

10. A method according to claim 9 in which said step of steering comprises the step of:

providing servo controls joined to displace control surfaces in accordance with said control signals to steer said rigid winged unmanned aircraft.

11. A method according to claim 10 further comprising the step of:

providing an RF antenna and receiver in said rigid winged unmanned aircraft to receive remotely originating RF control signals and to couple said RF control signals to said servo controls, said servo controls being responsive to displace said control surfaces in accordance with said RF control signals.

12. A method according to claim 11 in which said rigid winged unmanned aircraft is a guided wing design having rigid wings pivoted to extend therefrom.

13. A method of deploying a torpedo to a remote location without exposing personnel to risk at said remote location comprising the steps of:

mounting a torpedo attached to a parachute on a guided wing having rigid wings pivoted to laterally extend therefrom;

entering GPS coordinate signals in said guided wing representative of said remote location;

carrying said guided wing and torpedo aloft on a conventional aircraft;

releasing said guided wing from said conventional aircraft while aloft;

receiving GPS signals in said guided wing representative of the location of said guided wing as it glides toward said remote location;

generating control signals in said guided wing in response to said GPS coordinate signals and said GPS signals;

piloting said guided wing to said remote location in response to said control signals;

dropping said torpedo from said guided wing in response to GPS signals representative of at least an acceptable proximity of said remote location; and slowing the decent of said torpedo with said parachute in said acceptable proximity of said remote location.

14. A method of deploying according to claim 13 further comprising the steps of:

closing a pressure switch on said torpedo at a preset depth in water;

separating said parachute from said torpedo; and initiating battery power, seeker logic, and fuel propulsion systems on said torpedo to acquire a target.

\* \* \* \* \*